(12) United States Patent
Kelly et al.

(10) Patent No.: US 8,762,044 B2
(45) Date of Patent: Jun. 24, 2014

(54) SYSTEM AND METHOD FOR TESTING CRASH AVOIDANCE TECHNOLOGIES

(71) Applicant: Dynamic Research Inc., Torrance, CA (US)

(72) Inventors: Joseph Kelly, Lakewood, CA (US); Peter Broen, Torrance, CA (US); Jordan Silberling, Redondo Beach, CA (US); John Zellner, Rancho Palos Verdes, CA (US)

(73) Assignee: Dynamic Research, Inc., Torrance, CA (US)

( * ) Notice: Subject to any disclaimer, the term of this patent is extended or adjusted under 35 U.S.C. 154(b) by 0 days.

(21) Appl. No.: 14/062,287

(22) Filed: Oct. 24, 2013

(65) Prior Publication Data

US 2014/0058589 A1 Feb. 27, 2014

Related U.S. Application Data

(63) Continuation-in-part of application No. 13/532,417, filed on Jun. 25, 2012, now Pat. No. 8,583,358, and a continuation-in-part of application No. 13/532,430, filed on Jun. 25, 2012, now Pat. No. 8,589,062, which is a continuation-in-part of application No. 13/357,526, filed on Jan. 24, 2012, now Pat. No. 8,447,509, application No. 14/062,287, which is a continuation-in-part of application No. 14/050,039, filed on Oct. 9, 2013, and a continuation-in-part of application No. 14/050,048, filed on Oct. 9, 2013.

(60) Provisional application No. 61/507,539, filed on Jul. 13, 2011, provisional application No. 61/578,452, filed on Dec. 21, 2011, provisional application No. 61/621,597, filed on Apr. 9, 2012, provisional application No. 61/639,745, filed on Apr. 27, 2012, provisional application No. 61/874,274, filed on Sep. 5, 2013, provisional application No. 61/874,267, filed on Sep. 5, 2013, provisional application No. 61/874,264, filed on Sep. 5, 2013.

(51) Int. Cl.
| | | |
|---|---|---|
| *G06F 17/10* | (2006.01) |
| *G06G 7/78* | (2006.01) |
| *G08G 1/16* | (2006.01) |
| *B60T 7/18* | (2006.01) |
| *B60T 7/22* | (2006.01) |
| *G06F 7/00* | (2006.01) |

(52) U.S. Cl.
CPC ......... *G06F 7/00* (2013.01); *G08G 1/167* (2013.01); *B60T 7/18* (2013.01); *B60T 7/22* (2013.01); *G08G 1/166* (2013.01)
USPC .......................... 701/301; 434/305; 73/12.01

(58) Field of Classification Search
USPC .................. 701/206, 301; 73/12.01; 434/305
See application file for complete search history.

(56) References Cited

U.S. PATENT DOCUMENTS

| | | |
|---|---|---|
| 4,530,056 A | 7/1985 | MacKinnon et al. |
| 5,338,206 A * | 8/1994 | Hupfer .......................... 434/305 |

(Continued)

OTHER PUBLICATIONS

Zellner et al., "Extension of the Honda-DRI "Safety Impact Methodology" (SIM) for the NHTSA Advanced Crash Avoidance Technology (ACAT) Program and Application to a Prototype Advanced Collision Mitigation Braking System," SAE International, Paper No. 2009-01-0781; pp. 1-21, Apr. 20, 2009.

(Continued)

*Primary Examiner* — Tuan C. To
*Assistant Examiner* — Isaac Smith
(74) *Attorney, Agent, or Firm* — Manuel de la Cerra

(57) ABSTRACT

A Guided Soft Target System is disclosed that includes a subject vehicle and a dynamic motion element (DME). The subject vehicle may be accelerated at an arbitrary rate to a speed corresponding to the speed in its own predetermined trajectory. Each of the DME vehicles computes its target speed as a ratio of the subject vehicle's speed at each waypoint location, and modulates its speed control to achieve this target speed. To further compensate for timing differences along the target path, each DME computes its longitudinal error along the path relative to its target position, as dictated by the position of the subject vehicle within its own trajectory, and each DME's target speed is modulated in order to minimize the longitudinal error along the predetermined trajectory.

20 Claims, 4 Drawing Sheets

(56) References Cited

U.S. PATENT DOCUMENTS

| | | | |
|---|---|---|---|
| 5,550,742 | A | 8/1996 | Furuya et al. |
| 5,684,696 | A * | 11/1997 | Rao et al. ............ 701/25 |
| 6,114,985 | A | 9/2000 | Russell et al. |
| 7,103,704 | B2 | 9/2006 | Chatterjee |
| 7,575,491 | B1 | 8/2009 | Martin |
| 7,617,048 | B2 | 11/2009 | Simon et al. |
| 2005/0155441 | A1 | 7/2005 | Nagata |
| 2010/0087984 | A1 | 4/2010 | Joseph |
| 2010/0109835 | A1 | 5/2010 | Alrabady et al. |
| 2011/0270467 | A1 | 11/2011 | Steffan et al. |

OTHER PUBLICATIONS

Zellner et al., "Extension of the Honda-DRI "Safety Impact Methodology" (SIM) for the NHTSA Advanced Crash Avoidance Technology (ACAT) II Program and Application to the Evaluation of a Pre-Production Head-On Crash Avoidance Assist System—Progress Report", SAE International, Paper No. 2012-01-0291, pp. 1-20, Apr. 16, 2012.

Kelly et al., "Development of a Guided Soft Target for Crash Avoidance Technology Evaluation", SAE International, Paper No. 2011-01-0580, pp. 1-9, Apr. 12, 2011.

Testing and Verification of Active Safety Systems With Coordinated Automated Driving, Dr. Hans-Peter Schöner, Dr. Stephen Neads, Nikolai Schretter.

Development of advanced driver assistance systems with vehicle hardware-in-the-loop simulations, O. Gietelink, J. Ploeg, B. De Schutter, and M. Verhaegen, Vehicle System Dynamics, vol. 44, No. 7, pp. 569-590, Jul. 2006.

Vehicle to Vehicle Interaction Maneuvers Choreographed with an Automated Test Driver, Anmol Sidhu and Dennis A. Guenther, Ron A. Bixel and Gary J. Heydinger, Paper #: 2009-01-0440, Published: Apr. 20, 2009, SAE World Congress & Exhibition.

Automated Steering Controller for Vehicle Testing, Mikesell, D., Sidhu, A., Guenther, D., Heydinger, G. et al., Paper #: 2007-01-3647, Published: Aug. 5, 2007, Asia Pacific Automotive Engineering Conference.

* cited by examiner

Example GST System Architecture

SYSTEM AND METHOD FOR TESTING CRASH AVOIDANCE TECHNOLOGIES

1.0 TECHNICAL FIELD

The present invention relates to devices, systems, and methods for testing crash avoidance technologies.

2.0 BACKGROUND

The system disclosed herein can be used with, but is not limited to, vehicles employed in crash avoidance technologies disclosed in the following patent applications developed by the same inventors and assigned to the same assignee: U.S. patent application Ser. No. 14/050,039 entitled "System and Method for testing Crash Avoidance Technologies" filed on Oct. 9, 2013 by Joseph Kelly et al; U.S. patent application Ser. No. 14/050,048 entitled "System and Method for testing Crash Avoidance Technologies" filed on Oct. 9, 2013 by Joseph Kelly et al; U.S. Patent Application No. 61/874,274 entitled "Master-Slave Automated Coordinated Vehicle Control" filed Sep. 5, 2013 by Joseph Kelly et al; U.S. Patent Application No. 61/874,267 entitled "Rigid Belt Drive Tensioner" filed Sep. 5, 2013 by Joseph Kelly et al; U.S. Patent Application No. 61/874,264 entitled "Robotic Hydraulic Brake Master Cylinder" filed Sep. 5, 2013 by Joseph Kelly et al; U.S. patent application Ser. No. 13/357,526 entitled "System and Method for Testing Crash Avoidance Technologies" filed Jan. 24, 2012 by Joseph Kelly et al (issued as U.S. Pat. No. 8,447,509); U.S. Patent Application No. 61/507,539 entitled "Guided Soft Target For Full Scale Advanced Crash Avoidance Technology Testing" filed on Jul. 13, 2011 by Joseph Kelly et al; U.S. Patent Application No. 61/578,452 entitled "Guided Soft Target For Full Scale Advanced Crash Avoidance Technology Testing" filed on Dec. 21, 2011 filed by Joseph Kelly et al; U.S. Patent Application No. 61/621,597 entitled "Collision Partner, System and Method" filed on Apr. 9, 2012 by Joseph Kelly et al; U.S. Patent Application No. 61/639,745 entitled "Devices, Systems, And Methods For Testing Crash Avoidance Technologies" filed on Apr. 27, 2012 by Joseph Kelly et al; U.S. patent application Ser. No. 13/532,366 entitled "Devices, Systems, And Methods For Testing Crash Avoidance Technologies" filed on Jun. 25, 2012 by Joseph Kelly et al (issued as U.S. Pat. No. 8,428,863); U.S. patent application Ser. No. 13/532,383 entitled "Devices, Systems, And Methods For Testing Crash Avoidance Technologies" filed on Jun. 25, 2012 by Joseph Kelly et al (issued as U.S. Pat. No. 8,428,864); U.S. patent application Ser. No. 13/532,396 entitled "Devices, Systems, And Methods For Testing Crash Avoidance Technologies" filed on Jun. 25, 2012 by Joseph Kelly et al (issued as U.S. Pat. No. 8,457,877); U.S. patent application Ser. No. 13/532,417 entitled "Devices, Systems, And Methods For Testing Crash Avoidance Technologies" filed on Jun. 25, 2012 by Joseph Kelly et al; and U.S. patent application Ser. No. 13/532,430 entitled "Devices, Systems, And Methods For Testing Crash Avoidance Technologies" filed on Jun. 25, 2012 by Joseph Kelly et al. Each of these patent applications is incorporated herein in their entirety including all tables, figures, and claims.

As Advanced Crash Avoidance Technologies (ACATs) such as Forward Collision Warning (FCW), Crash Imminent Braking Systems and other advanced technologies continue to be developed, the need for full-scale test methodologies that can minimize hazards to test personnel and damage to equipment has rapidly increased. Evaluating such ACAT systems presents many challenges. For example, the evaluation system should be able to deliver a potential Soft Collision Partner (Soft CP) reliably and precisely along a trajectory that would ultimately result in a crash in a variety of configurations, such as rear-ends, head-ons, crossing paths, and side-swipes. Additionally, the Soft Collision Partner should not pose a substantial physical risk to the test driver, other test personnel, equipment, or to subject vehicles in the event that the collision is not avoided. This challenge has been difficult to address. Third, the Soft CP should appear to the subject vehicle as the actual item being simulated, such as a motor vehicle, a pedestrian, or other object. For example, the Soft CP should provide a consistent signature for radar and other sensors to the various subject vehicles, substantially identical to that of the item being simulated. It would be also advantageous for the Soft CP to be inexpensive and repeatably reusable with a minimum of time and effort.

As disclosed in the inventors' previous patent applications, fully incorporated herein by reference, the Guided Soft Target (GST) system includes a dynamic motion element (DME) as a mobile and controllable platform that carries the Soft CP. The DME is of such shape and dimension that it can be run over by the vehicle under test (aka the subject vehicle), with little to no damage to either the DME or the subject vehicle. When a collision occurs with the GST system, the subject vehicle impacts the Soft CP, which then absorbs the collision and may collapse. Such a Soft CP is disclosed in U.S. patent application Ser. No. 13/532,366 (issued as U.S. Pat. No. 8,428,863), incorporated by reference. This is disclosed fully in the previous patent applications listed above and incorporated by reference.

The innovations disclosed in this application are directed to systems that guide and control the components of the GST system including the DME, more specifically to closely control the movements of two or more vehicles in coordinated predetermined movements.

3.0 SUMMARY

A Guided Soft Target System is disclosed that includes a subject vehicle and a dynamic motion element (DME). The subject vehicle may be accelerated at an arbitrary rate to a speed corresponding to the speed in its own predetermined trajectory. Each of the DME vehicles computes its target speed as a ratio of the subject vehicle's speed at each waypoint location, and modulates its speed control to achieve this target speed. To further compensate for timing differences along the target path, each DME computes its longitudinal error along the path relative to its target position, as dictated by the position of the subject vehicle within its own trajectory, and each DME's target speed is modulated in order to minimize the longitudinal error along the predetermined trajectory.

Other aspects of the invention are disclosed herein as discussed in the following Drawings and Detailed Description.

4.0 BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views. It will be understood that certain components and details may not appear in the figures to assist in more clearly describing the invention.

5.0 DETAILED DESCRIPTION

Following is a non-limiting written description of example embodiments illustrating various aspects of the invention. These examples are provided to enable a person of ordinary skill in the art to practice the full scope of the invention without having to engage in an undue amount of experimentation. As will be apparent to persons skilled in the art, further modifications and adaptations can be made without departing from the spirit and scope of the invention, which is limited only by the claims.

Figure 1:
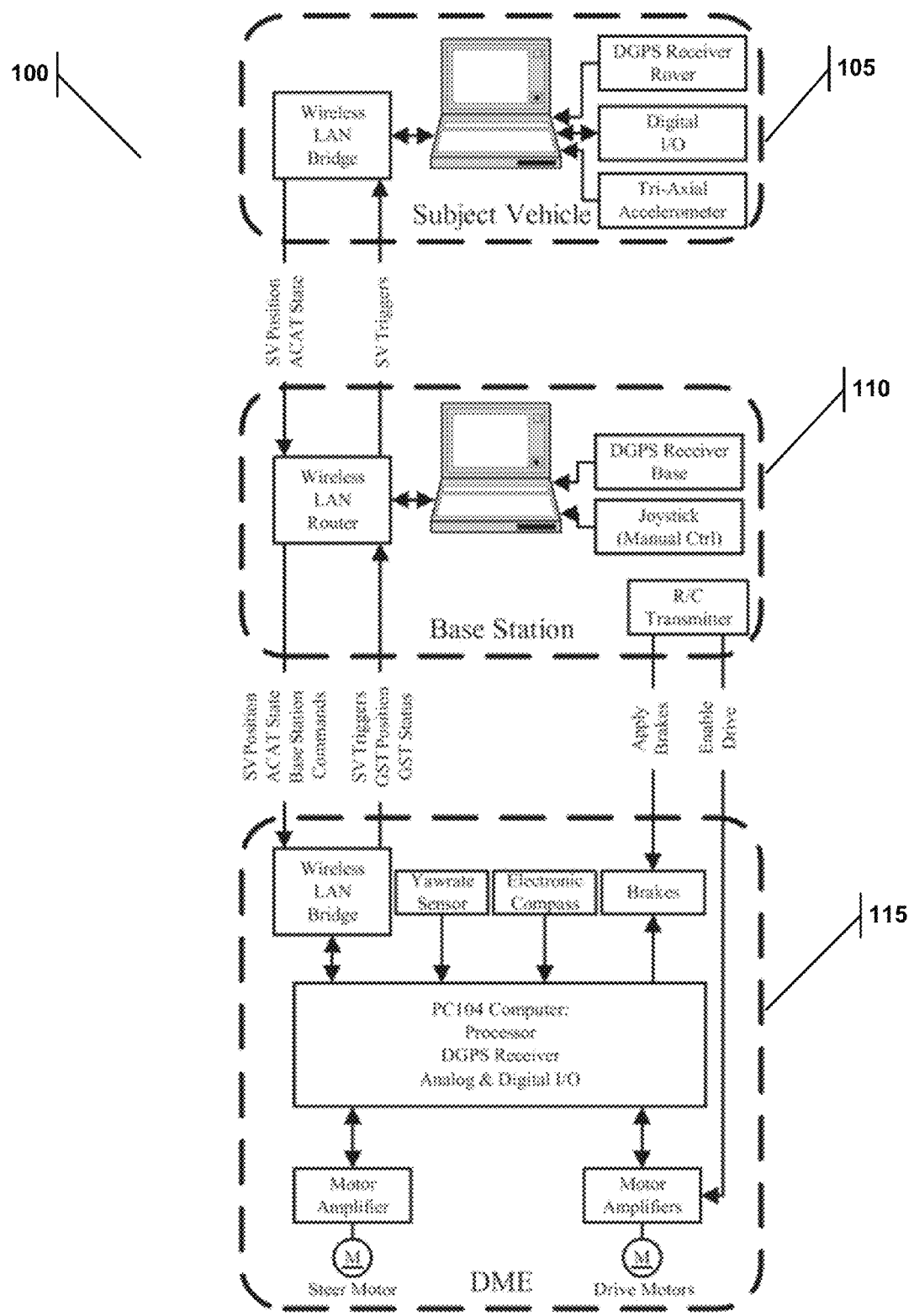
FIG. 1 illustrates an example GST System architecture.

As disclosed in patent application Ser. No. 13/357,526 incorporated herein by reference, an example GST system architecture and functions are disclosed. GST systems in various example embodiments may comprise, for instance, a plurality of computers that communicate, for instance via a Wireless Local Area Network (WLAN), and perform various functions. FIG. 1 illustrates the overall architectural layout of an example GST system 100, which may include the following nodes and their associated peripheral equipment, for example: a subject vehicle 105; base station 110; and DME 115.

The computer associated with the subject vehicle 105 may perform the various data I/O functions within the subject vehicle 105, and provide the measured data to the rest of the system. Additionally, the subject computer may control discrete events within the subject vehicle 105. The subject vehicle 105 node may comprise the following components, for example: notebook computer; differential GPS (DGPS) receiver; tri-axial accelerometer; digital I/O board to monitor and control discrete events (e.g., sense ACAT warning on/off, illuminate LEDs, initiate open-loop braking, provide audible alerts); and wireless LAN bridge, for instance.

The base station 110 may act as the central hub for all communications and allow the operator to monitor and control the system. The base station 110 may comprise the following components, for example: DGPS base station receiver; notebook computer; joystick; wireless LAN router; and radio transmitter to provide emergency-stop capability, for instance.

The computer associated with the base station 110 may allow the system operator to run a complete suite of tests from a single location. From the computer associated with the base station 110, the operator may perform the following functions, for example: setup and configuration of subject vehicle 105 and GST computers via remote connection; monitor subject vehicle 105 and GST positions, speeds, system health information and other system information; setup of test configuration; test coordination; post-test data analysis; and selection of GST modes, including, for example: hold; manual; semi-autonomous; and fully autonomous, for instance. Additionally, the functions of the computer associated with the base station 110 may also be accomplished on the computer associated with the subject vehicle 105, reducing the number of computers in the computer network. In this embodiment of a GST, the base station, or operator's console would be located in the subject vehicle 105. The methods used for subject vehicle 105 and DME 115 control and positioning are described below with reference to FIG. 3.

The DGPS receiver in the base station 110 may provide corrections to the roving DGPS receivers in both the DME 115 and the subject vehicle 105 via a WLAN or other communications network. This may be accomplished without the need for a separate DGPS radio modem, minimizing the number of antennas on each node of the system. This may be important in the case of the DME 115, since all connections to antennas are typically made frangible, such that they can separate from the DME 115 in the event of a collision with the subject vehicle 105.

Example DME 115 subsystems may comprise the following components, among others, for instance: wireless LAN bridge; PC104 computer; yaw rate sensor; electronic compass; two brushless DC drive motors and amplifiers; a brushless DC steering motor and amplifier; brake system; RF emergency brake system; DGPS receiver; a DME computer such as a PC104 computer that performs functions such as the following example functions: Guidance, Navigation and Control (GNC) computations; analog and digital data input and output; inputs, including: differential GPS information; electronic compass (heading angle); yaw rate; drive motor speed; steering angle; drive motor amplifier temperature; drive motor winding temperature; and outputs, including: drive motor torque command; steer motor angle command; brake command; system health monitoring; and data collection, for instance. Other or fewer components may be used in various example embodiments.

Figure 2:
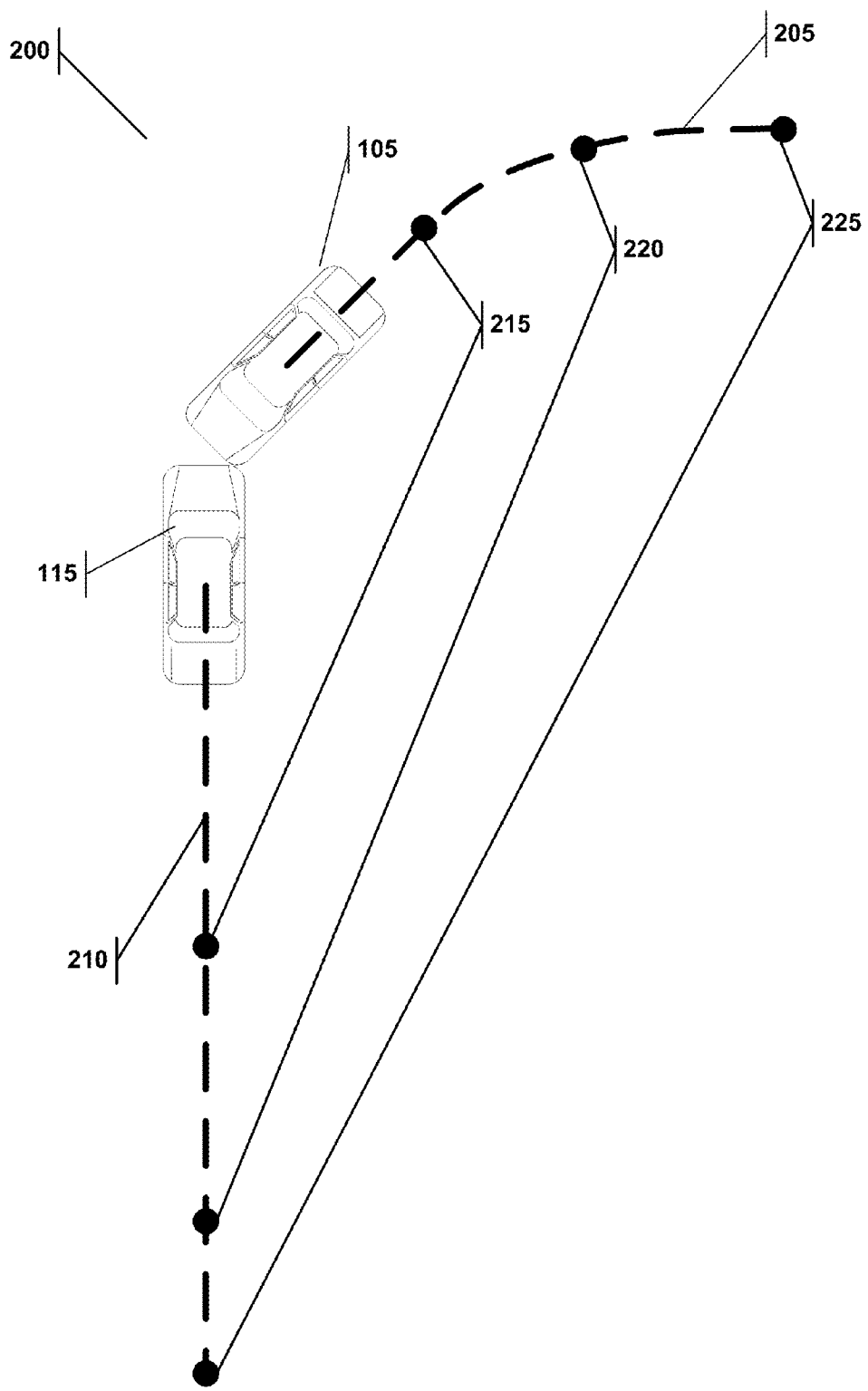
FIG. 2 illustrates the trajectories and collision for a subject vehicle and a DME.

Prior to testing, paired time-space trajectories for the subject vehicle 105 and DME 115 (preferably loaded with a soft CP) may be generated. For example, FIG. 2 illustrates such a paired time-space trajectory 200. Subject vehicle 105 has a trajectory 205, while the DME 115 (here shown loaded with a soft CP, this combination is sometime referred to as the GST) has a trajectory 210. The time-space trajectories for each involved vehicle are generated such that spatial (e.g., X, Y, Z) waypoints are defined for each vehicle at specific, non-absolute (relative) points in time. In general, the waypoints are not required to occur at set spatial or temporal intervals; however, waypoints in each trajectory should occur at the same relative timing. In other words, way point 1 (215) occurs at the same relative time in the scenario for both the subject vehicle 105 and DME 115. Likewise waypoint 2 (220) occurs at the same time for both the subject vehicle 105 and DME 115, as does waypoint 3 (225). Further, a speed is defined for each vehicle at each waypoint, as well as a ratio of the slave vehicle speed, relative to the master vehicle's speed at each waypoint. The trajectory file for the subject vehicle has an array of waypoints, and the DME trajectory file has a corresponding array of waypoints, such that if the subject vehicle position within its own trajectory is known, the corresponding waypoint in the DME trajectory file can be determined, which indicates a target position for the DME.

One embodiment of a trajectory file is an ASCII file with a format as depicted in Table 1 below. The files may include some basic header information and a set of data for each waypoint. Each line in the file defines a waypoint and various data associated with such waypoint. A waypoint is a point in space along the vehicle's path. Each subject vehicle waypoint corresponds to a DME waypoint such that, when the subject vehicle is at waypoint 10, for example, the DME should also be at its waypoint 10. The trajectory file may also consist of other data such as the speed ratio (SR) (ratio of this vehicles speed to the other vehicle) and the speed (Spd).

TABLE 1

Sample Trajectory File

| X(1)   | Y(1)   | SR(1)   | Spd(1)   |
|--------|--------|---------|----------|
| X(2)   | Y(2)   | SR(2)   | Spd(2)   |
| ...    | ...    | ...     | ...      |
| X(n − 1) | Y(n − 1) | SR(n − 1) | Spd(n − 1) |
| X(n)   | Y(n)   | SR(n)   | Spd(n)   |

Each vehicle in the test would have its own trajectory file. Alternatively, the GST system 100 may implement a single trajectory file with position and speed data for each vehicle at each waypoint.

The GST system 100 may use a trajectory file that causes a collision between the subject vehicle 105 and DME 115, as shown in FIG. 2. This also illustrates three waypoints, although it would be obvious that several waypoints may be used. Preferably the difference in time between waypoints is about $\frac{1}{10}^{th}$ of a second. By having such a high sampling of waypoints along the trajectories, the GST system 100 can more effectively control the various vehicles and ensure the proper collision and performance.

These trajectories should be physics-based, and either can be hypothetical or reconstructed real-world crash scenarios. Trajectories can be specified to result in no collision, or any manner of collision between the subject vehicle 105 and DME 115, and can include variations in speed and path curvature for both the subject vehicle 105 and DME 115. The spatial trajectories may be stored in files which also include subject vehicle 105 and DME 115 speeds along their respective paths, and scenario-specific discrete events. These discrete events (e.g., point of brake application) can be used to control the timing of events in the subject vehicle 105 at known points along the subject vehicle 105 path. These can be used to initiate open-loop braking, illuminate LEDs, or provide audible alerts within the subject vehicle 105, for example.

In various embodiments a GST system 100 may have, for instance, four different modes of operation: hold; manual; semi-autonomous; and fully-autonomous. The Hold Mode is the "idle" mode for the GST system. In this mode, the output signals to the steering and drive motors may be nullified, but the GUI for the base station 110 may continue to show data from the DME 115 and subject vehicle 105 sensors. Whenever the DME 115 is switched into this mode from one of the "active" modes (e.g., Manual, Semi-Autonomous or Fully Autonomous), data that was collected during the active mode may be transferred wirelessly to the computer associated with the base station 110 for further analysis.

The Manual Mode may be completely human-controlled via a joystick associated with the base station 110. In this mode, the operator may have remote control over the speed and steering of the DME 115. This mode may be useful in pre-positioning the DME 115 or for returning it to base for charging the batteries, routine service, or for shutting down the system.

The Semi-Autonomous Mode allows the operator of the base station 110 to control the speed of the DME 115 while the path following may be accomplished autonomously. This may be especially useful for pre-positioning the DME 115 before a given test run, since the DME 115 can be driven starting from any point on the test surface, and it will seek and converge on the desired path. The path-following GNC algorithm also may allow for operation in reverse, allowing the operator to drive the DME 115 in reverse along the path for fast repetition of tests.

The Fully Autonomous Mode may require no further inputs from the base station 110. In this mode, the subject vehicle 105 may be driven along the subject vehicle 105 path, and the DME 115 computes the speed and steering inputs necessary to move along its own path in coordination with the subject vehicle 105, as determined by the pre-programmed trajectory pair. In this way, the longitudinal position of the DME 115 may be driven by the longitudinal position of the subject vehicle 105 such that the DME 115 arrives at the pre-determined collision point at the same moment as the subject vehicle 105, even accommodating errors in the speed of the subject vehicle 105 (relative to the speed in the trajectory file) as it approaches by adjusting its own speed. As an option, the test engineer can enable a sub-mode in which, if the subject vehicle 105 driver or ACAT system begins to react to the impending collision, the DME 115 speed command may be switched to the speed contained in the trajectory file such that it is no longer dependent upon the speed of the subject vehicle 105. The switch to this sub-mode may be made automatically (mid-run) when the subject vehicle 105 acceleration exceeds a predetermined threshold (e.g., 0.3 g) or when subject vehicle 105 ACAT system activation may be sensed via a discrete input. In this way, the DME 115 passes through the would-be collision point at the speed prescribed in the trajectory file, irrespective of the position or speed of the subject vehicle 105.

During test setup, the paired time-space trajectories may be wirelessly loaded into the DME 115 on-board processor from the base station 110, and the DME 115 may be placed into the fully autonomous mode. As the subject vehicle 105 begins to travel along its path, its position (as measured by DGPS) may be transmitted wirelessly to the DME 115 processor, which may be programmed to accomplish lateral and longitudinal control to obtain the desired relative closed-loop trajectories. A given test run can culminate in a collision between the subject vehicle 105 and the DME 115, in which case, the DME 115 may be brought to a stop using a radio transmitter, separate from the WLAN, which can actuate the onboard brakes of the DME 115, and disable the drive motors. Test data may be automatically transmitted wirelessly from the DME 115 to the computer associated with the base station 110 once the operator transitions from the Fully Autonomous mode to the Hold mode.

The DME 115 may employ high-performance and high-efficiency components, allowing it to reach relatively high speeds and achieve high positional accuracy along its trajectory. Brushless DC drive motors efficiently deliver high power from a small package, and a DGPS receiver provides high positional accuracy.

Each vehicle (i.e., the DME 110 and the subject vehicle 105) is equipped with sensing technology allowing it to determine at least its position, its orientation and its velocity with respect to some known coordinate system. This sensing technology may consist of DGPS or any other position measurement system. The sensor optionally may be integrated with an Inertial Measurement Unit (IMU) which improves the accuracy of the sensed signals. Speed signals can be measured from GPS, an IMU, or an independent speed sensor (such as a Doppler or optical speed sensor).

Each DME is equipped with means to regulate its lateral path deviation (e.g., through means of automatic steering) and to regulate its speed along its predetermined path (e.g., through means of automatic speed control—motor, engine, brake, etc.).

The subject vehicle is equipped with a means of broadcasting its own position, speed and orientation, such that the GST System 100 can determine where the subject vehicle is along the predetermined subject vehicle path. This can be done by any means, including Wireless Local Area Network (LAN), Controller Area Network (CAN) or any other wired or wireless means of data transmission.

The subject vehicle can be manually operated by a human operator, or can be automatically or autonomously controlled to move along the intended path at varying speed. All vehicles are initially positioned at or near starting locations corresponding to positions within, or extrapolated from the predetermined trajectories. The subject vehicle is accelerated at an arbitrary rate to a speed corresponding to the speed in its own predetermined trajectory. Each of the DME vehicles (there can be more than one) computes its target speed as a ratio of the subject vehicle's speed at each waypoint location, and modulates its speed control to achieve this target speed. To further compensate for timing differences along the target path, each DME computes its longitudinal error along the path relative to its target position, as dictated by the position of the subject vehicle within its own trajectory, and each DME's target speed is modulated in order to minimize the longitudinal error along the predetermined trajectory.

Figure 3:
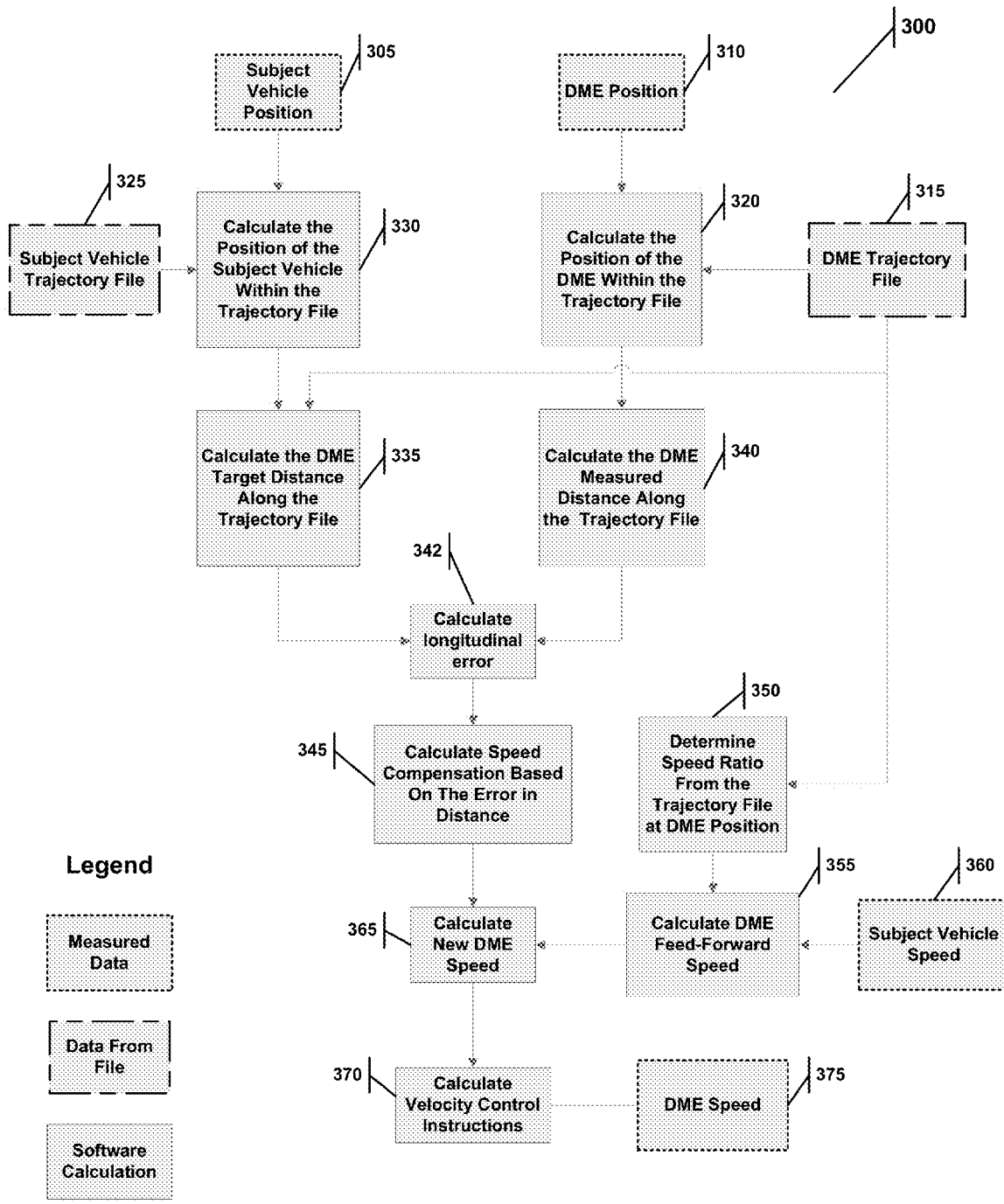
FIG. 3 is a flowchart detailing the method for controlling the speed and position of the various vehicles within the GST System.

Turning now to FIG. 3, the method 300 is an example embodiment of this method. The items in this figure that are framed by a dotted line are measured data, those framed by a dashed line are file data and those framed by a solid line are software calculations. This method 300 can be performed anywhere within the GST system 100. Optionally, some portions can be performed in one part of the GST system 100 (e.g. the DME 115), while other portions are performed in another (e.g. the base station 110).

Method 300 begins by determining the position of the subject vehicle and DME in steps 305 and 310 (this can be done by GPS measurements). The DME position 310 is used to calculate the position of the DME within the DME trajectory file 315, as shown in step 320. In step 330 a similar calculation is done for the subject vehicle within the subject vehicle trajectory file 325. Both the subject vehicle and DME trajectory files may be consolidated into a single file. At step 335, the method 300 uses the position of the subject vehicle within the trajectory file from step 330 to find the target position of the DME within the DME trajectory file. Recall that the trajectory files have discrete waypoints at simultaneous times, therefore knowing where the subject vehicle is along its trajectory, the method 300 can calculate where the DME should be according to the DME trajectory file.

DME's measured (or actual) distance is determined along the trajectory file at step 340. The difference between the two values of steps 335 and 340 calculated at step 342 would represent a distance deviation (i.e., the longitudinal error) from the programmed trajectory of the DME which, in turn, would prevent the collision from occurring at the expected conditions (i.e., position, speed, location of impact on the vehicle).

The method 300 must therefore compensate the speed of the DME to regulate this error, which is done at step 345. This speed compensation is added to a "feed-forward" speed, calculated in step 355, in order to determine the actual desired speed of the DME in step 365. The "feed-forward" speed is an estimate of the required speed of the DME to achieve the desired longitudinal control without any feedback from the DME (i.e., open-loop control). The "feed-forward" speed accounts for the current actual speed of the subject vehicle at step 350, by determining the speed ratio from the trajectory file for the DME at the current position. For example, at the current position the subject vehicle should be traveling at 60 KPH while the DME is to travel at 30 KPH. The speed ratio is therefore 2:1, or the DME travels at 0.5 the speed of the subject vehicle. At step 355, the method uses the subject vehicle speed 360 to determine a "feed-forward" speed. For example, if the subject vehicle is traveling 20% faster than it should, at this waypoint, the "feed-forward" speed would be: 72 KPH (speed of subject vehicle)×0.5 (speed ratio)=36 KPH. Therefore, a component of the speed command to the DME is generated by the speed ratio applied to the measured speed of the subject vehicle.

The "feed-forward" speed and the speed compensation based on the error in distance (i.e., step 345) are combined at step 365 to calculate a new DME speed. The new instructions for the speed controller are calculated at step 370, which relies in part on the current speed of the DME 375. If for example, the commanded speed is 36 KPH and the current DME speed is only 30 KPH, then the system would know that it is far from the needed speed and might create an instruction for the controller to accelerate at a high rate to get to the target speed as fast as possible. If, however, the difference is only 0.5 KPH, the acceleration in the controller instruction might be less. This may be accomplished using, for example, a Proportional/Integral (PI) feedback control to regulate and minimize the error.

The above description has been limited to a two vehicle scenario. However, it would be apparent to those in the art that these teachings can be used to control more than two vehicles. For example, the test scenario may require two DMEs to collide with the subject vehicle. In such a case, each vehicle would have its own trajectory file, and the speed and position of each vehicle can be controlled by the method 300 described above. The GST System 100 would run the method 300 for the second DME as it did for the first, keeping the second vehicle as true to the trajectory as possible.

Figure 4:
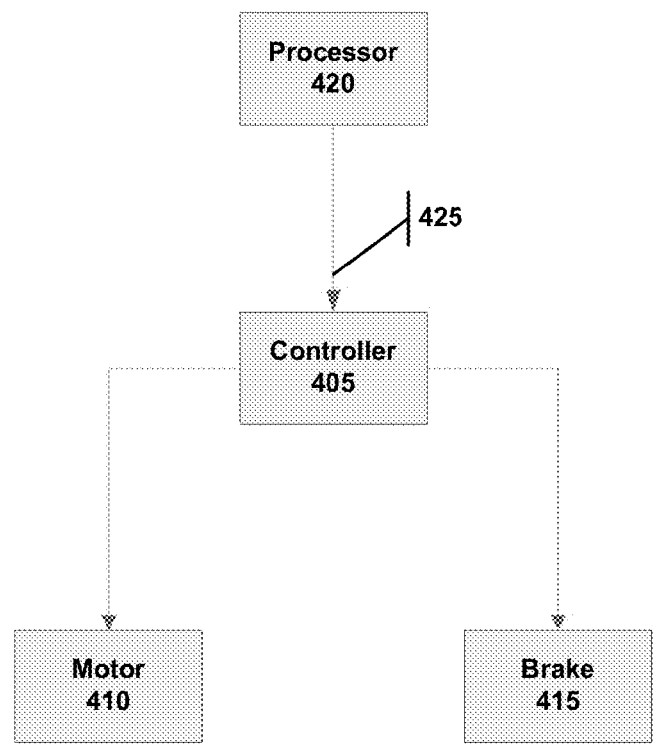
FIG. 4 illustrates how the controller instructions from the method of FIG. 3 are implemented by the GST system.

FIG. 4 illustrates the DME 115 which has a speed controller 405, motor 410 that propels a wheel (not shown) and a brake 415. Depending on the controller instruction from the method 300, the controller may instruct the motor to accelerate, decelerate, and may instruct the brake to actuate. The instructions are provided by the processor 420 which performs the method 300. The processor, as described above, may be located in various locations within the GST System. In one embodiment, the processor 420 is located in the base station and the control instruction would be sent to the DME 115 via wireless signal 425.

As will be apparent to persons skilled in the art, modifications and adaptations to the above-described example embodiments of the invention can be made without departing from the spirit and scope of the invention, which is defined only by the following claims.

The invention claimed is:

1. A Guided Soft Target (GST) system comprising:
a subject vehicle (SV) with a SV position sensor;
a dynamic motion element (DME) with a DME position sensor wherein the DME comprises a body comprising an upper surface wherein the upper surface is adapted to support a soft-body having the size and shape of a vehicle or a portion of a vehicle, the body having at least one tapered side so as to allow the subject vehicle to drive up to and on the upper surface with minimal to no damage to the subject vehicle or the DME, the body further supported by a plurality of wheels;
a SV trajectory file representing the trajectory of the SV, comprising an array of SV waypoints and SV speeds;
a DME trajectory file representing the trajectory of the DME, comprising a second array of DME waypoints and DME speeds, each DME waypoint and DME speed corresponds to a SV waypoint and SV speed in the SV trajectory file;

a processor, adapted to perform the following steps:
  (a) determine a location of the SV from the SV position sensor and the position of the DME from the DME position sensor;
  (b) calculate the position of the SV along trajectory represented by the SV trajectory file and determine the SV waypoint for that position in the SV trajectory file;
  (c) determine the corresponding DME waypoint from the DME trajectory file;
  (d) calculate the longitudinal error of the DME; and
  (e) calculate a speed compensation based on the longitudinal error.

2. The GST system of claim 1, wherein the subject vehicle comprises a SV speed sensor and the step performed by the processor further comprise:
  (f) determine a speed ratio from the SV trajectory file and DME trajectory file for determined DME way point from step (c);
  (g) determine the speed of the SV from the SV speed sensor, and
  (h) calculate a new DME speed.

3. The GST system of claim 2, wherein the DME comprises a DME speed sensor and the step performed by the processor further comprise:
  (i) determine the speed of the DME from the DME speed sensor, and
  (j) calculate velocity control instructions.

4. The GST system of claim 1, wherein:
  the DME further comprises a speed controller connected to a motor that propels a wheel;
  the speed controller receives a control instruction from the processor, wherein the instruction is based on the calculation of step (e).

5. The GST system of claim 4, wherein the controller is connected to a brake that brakes the wheel.

6. The GST system of claim 4, wherein the instruction comprises an acceleration of the motor.

7. The GST system of claim 5, wherein the instruction comprises an actuation of the brake.

8. The GST system of claim 1, wherein the SV trajectory file and the DME trajectory file comprise a single file.

9. The GST system of claim 4, wherein the control instruction is sent to the DME via a wireless signal.

10. A method of controlling the speed of a dynamic motion element (DME) used in testing a crash avoidance technology of a subject vehicle (SV), the DME connected to a processor, wherein the processor is connected to a memory, the method comprising:
  (a) providing a DME comprising a body comprising an upper surface wherein the upper surface is adapted to support a soft-body having the size and shape of a vehicle or a portion of a vehicle, the body having at least one tapered side so as to allow the subject vehicle to drive up to and on the upper surface with minimal to no damage to the subject vehicle or the DME, the body further supported by a plurality of wheels
  (b) storing a SV trajectory file in the memory representing the trajectory of the SV, comprising an array of SV waypoints and SV speeds;
  (c) storing a DME trajectory file in the memory representing the trajectory of the DME, comprising a second array of DME waypoints and DME speeds, each DME waypoint and DME speed corresponds to a SV waypoint and SV speed in the SV trajectory file;
  (d) determining, by the processor, an actual location of the SV and the actual position of the DME;
  (d) calculating, by the processor, the position of the SV along trajectory represented by the SV trajectory file and determine the SV waypoint for that position in the SV trajectory file;
  (f) determining, by the processor, the corresponding DME waypoint from the DME trajectory file;
  (g) calculating, by the processor, the longitudinal error of the DME; and
  (h) calculating, by the processor, a speed compensation based on the longitudinal error.

11. The method of claim 10, further comprising:
  (i) determining, by the processor, a speed ratio from the SV trajectory file and DME trajectory file for determined DME way point from step (d);
  (j) determining, by the processor, the speed of the SV from the SV speed sensor, and
  (k) calculating, by the processor, a new DME speed.

12. The method of claim 11, further comprising:
  (l) determining, by the processor, the speed of the DME from the DME speed sensor; and
  (m) calculating, by the processor, velocity control instructions.

13. The method of claim 10, further comprising sending, by the processor, a controller instruction to the DME.

14. The method of claim 13, wherein the controller instruction is sent wirelessly.

15. The method of claim 13, further comprising:
  (n) actuating, by the processor, a motor based on the controller instruction.

16. The method of claim 13, further comprising:
  (n) actuating, by the processor a brake based on the controller instruction.

17. A Dynamic Motion Element (DME) for use in testing crash avoidance technologies in a subject vehicle, the DME comprising:
  a body comprising an upper surface wherein the upper surface is adapted to support a soft-body having the size and shape of a vehicle or portion of a vehicle, the body having at least one tapered side so as to allow the subject vehicle to drive up to and on the upper surface with minimal to no damage to the subject vehicle or the DME, the body supported by a plurality of wheels, including at least one motorized wheel coupled to an electronic controller, and at least one steerable wheel coupled with the electronic controller; and
  wherein the electronic controller is adapted to track the trajectory of the subject vehicle, and steers the at least one steerable wheel to place the DME on a collision course with the subject vehicle.

18. The DME of claim 17, wherein the electronic controller adjusts the speed of the at least one motorized wheel to place the DME on a collision course with the subject vehicle.

19. The DME of claim 17, wherein the electronic controller tracks the trajectory of the subject vehicle based on a preprogramed subject vehicle trajectory file representing the trajectory of the subject vehicle, comprising an array of subject vehicle waypoints and subject vehicle speeds.

20. The DME of claim 17, further comprising a braking system coupled to the electronic controller and capable of applying braking force to one or more of the plurality of wheels, wherein the electronic controller adjusts the braking force to place the DME on a collision course with the subject vehicle.

* * * * *